Nov. 20, 1962 A. W. SERIO 3,065,017
DETACHABLE HANDLE APPARATUS
Filed April 18, 1960 3 Sheets-Sheet 1
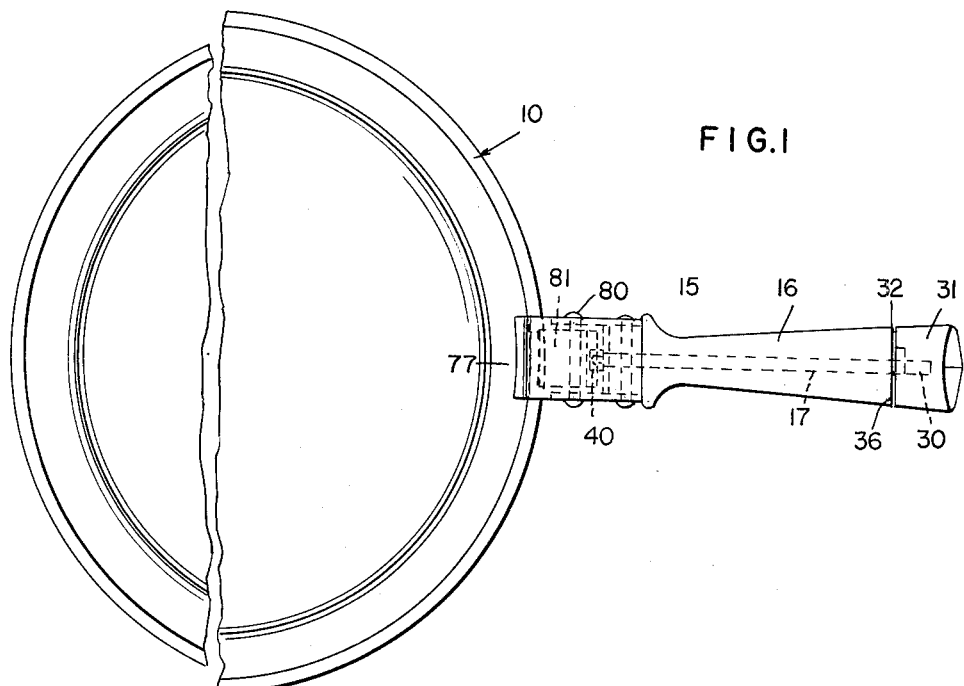
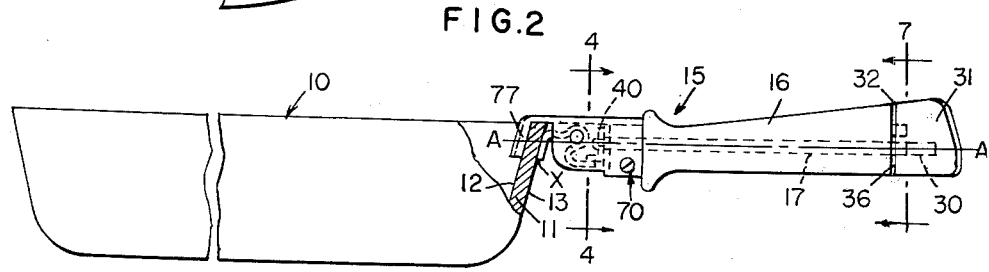
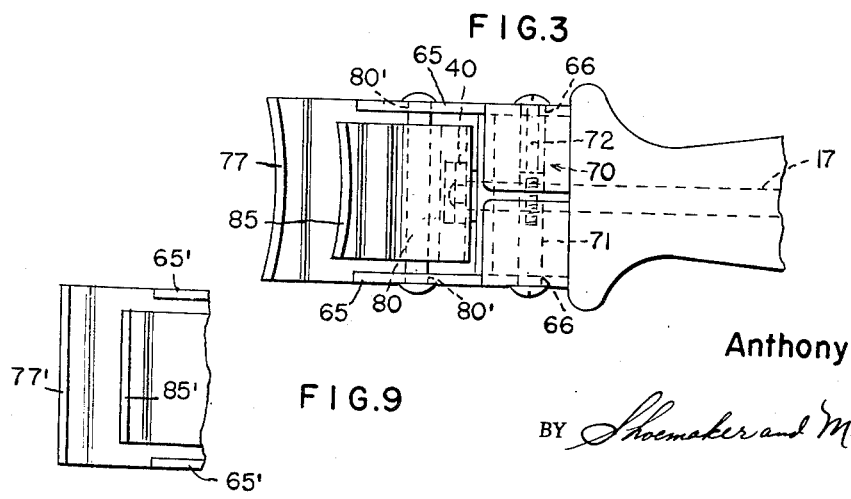
INVENTOR
Anthony W. Serio
BY *Shoemaker and Mattare*
ATTORNEYS Nov. 20, 1962  A. W. SERIO  3,065,017
DETACHABLE HANDLE APPARATUS
Filed April 18, 1960
3 Sheets-Sheet 2
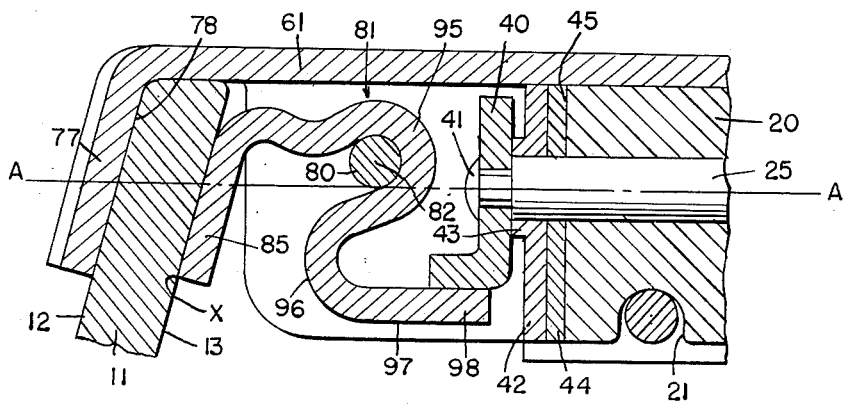
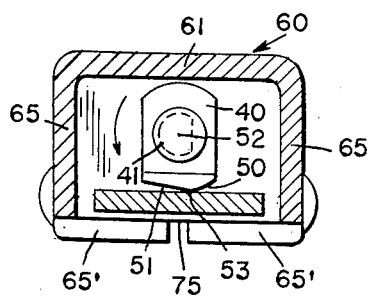
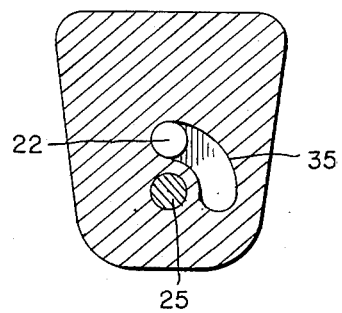
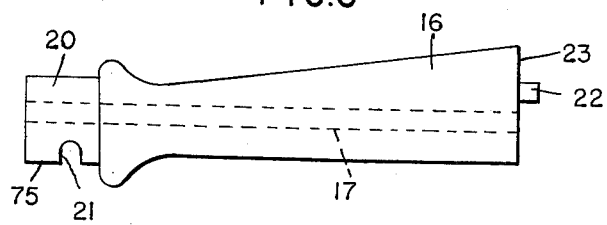
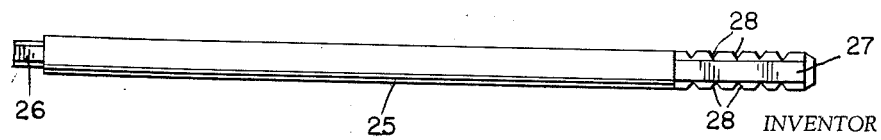
INVENTOR
Anthony W. Serio
BY *Shoemaker and Mattare*
ATTORNEYS Nov. 20, 1962 A. W. SERIO 3,065,017
DETACHABLE HANDLE APPARATUS
Filed April 18, 1960 3 Sheets-Sheet 3
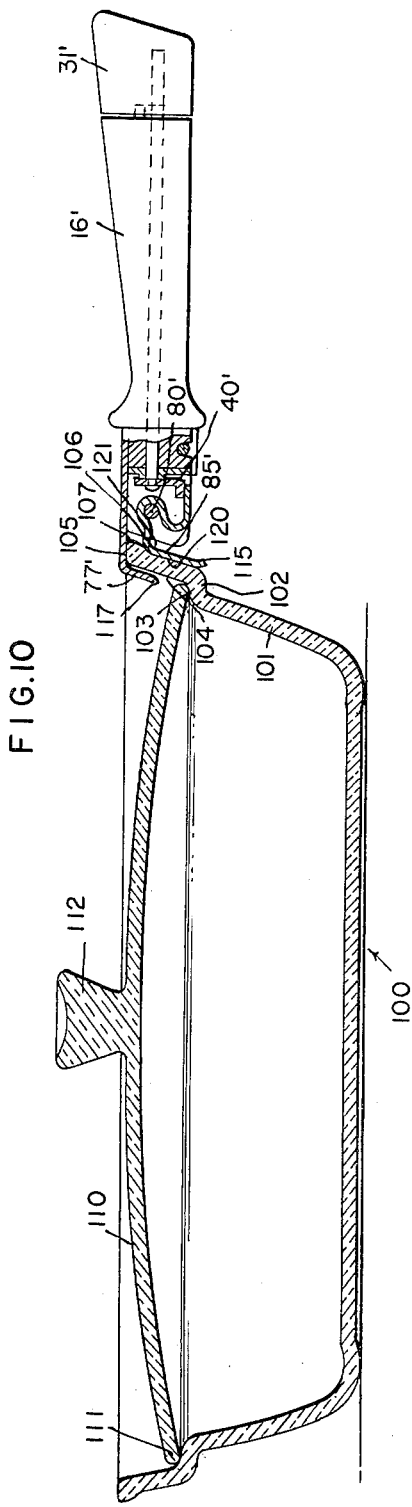
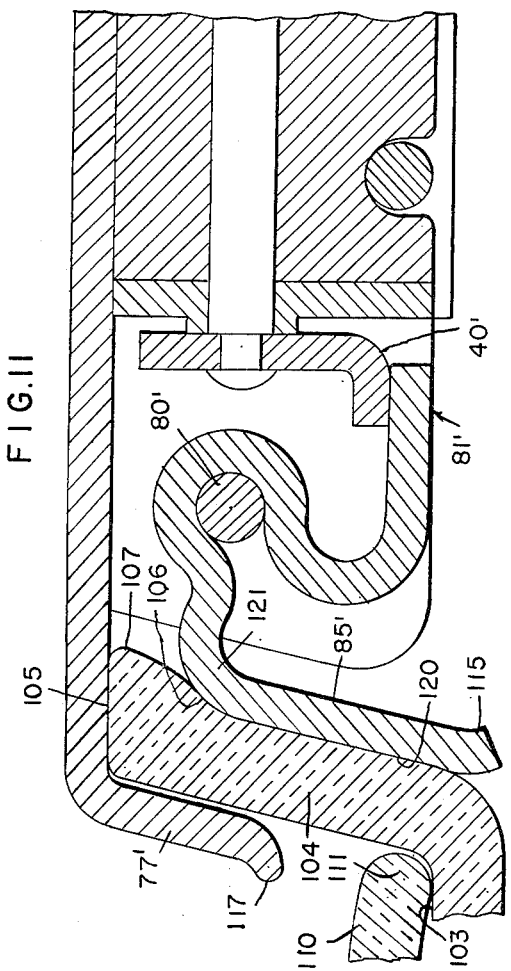
INVENTOR
Anthony W. Serio
BY Shoemaker and Mattare
ATTORNEYS ര
United States Patent Office 3,065,017
Patented Nov. 20, 1962

3,065,017
DETACHABLE HANDLE APPARATUS
Anthony W. Serio, 1704 Caton Ave., Elmira, N.Y.
Filed Apr. 18, 1960, Ser. No. 22,781
3 Claims. (Cl. 294—31)

The present invention relates to a detachable handle apparatus, and more particularly to a detachable handle apparatus which is adapted to be quickly attached to articles such as casserole dishes and the like. The present invention comprises an improvement over U.S. Patent No. 2,851,299.

When using casserole dishes or the like, the dish often becomes very hot as a result of cooking foods in an oven or the like and it is desirable to provide means for lifting the dish from place to place without the necessity of handling it with bulky, heat insulating pads and the like. It is accordingly a primary object of the present invention to provide a detachable handle which can be quickly and easily attached to and removed from such a dish for lifting and handling the dish without the necessity of actually touching the dish and further providing a heat insulating means which prevents discomfort to the hands of the user.

It is additionally important to provide a detachable handle mechanism which when mounted in position on a dish presents a neat and pleasant appearance and which provides a construction which is relatively compact and light in weight.

The above objectives are accomplished in the present invention by providing a detachable handle apparatus which fits over one wall of a casserole dish or the like with which the device is employed.

Devices of this type such as shown in the aforementioned prior art patent have served the purpose admirably, but it is necessary to provide the casserole dish or the like with laterally projecting lips which extend a considerable distance outwardly from the dish in order that the clamping mechanism of the handle apparatus is adapted to tightly clamp this lip. The provision of such laterally extending lips or handle-like portions on the dish and the like is an undesirable feature since it involves an extra expansion and provides relatively fragile laterally extending projections which are subject to breakage when carelessly handled.

It is accordingly a principal object of the present invention to provide an arrangement wherein such types of special laterally extending lips or handle-like portions formed on the dish are eliminated, and the arrangement is such that the detachable handle apparatus can be clamped directly to one of the upstanding wall portions of a casserole dish.

In order to accomplish the desired results, the present invention employs a novel structural arrangement wherein the forward end portion of the handle is provided with a depending gripping shoulder which is provided with an inner surface which extends downwardly at an obtuse angle to the longitudinal axis of the handle means. In addition, a clamping means in the form of a unitary clamping element is pivotally supported at the forward end of the handle and includes a clamping end portion which is adapted to cooperate with the gripping shoulder to clamp the wall of a receptacle between the clamping element and the gripping shoulder. When in operative position, the clamping end portion of the clamping element extends substantially parallel to the adjacent inner surface of the gripping shoulder whereby both the gripping shoulder and the clamping end portion of the clamping element extend downwardly at an obtuse angle to the longitudinal axis of the handle means. With this arrangement, the clamped receptacle when under load tends to pivot about the lower forward end of the clamping element in such a manner that it will not tend to fall out of the handle, but will tend to be held in the handle due to the fact that the center of gravity is spaced from the pivot point and will move the wall of the receptacle against the inner wall of the gripping shoulder. In this manner, the necessity of providing the aforementioned special laterally extending lip or handle-like portions on the receptacle itself is completely eliminated. In one form of the invention, an especially constructed casserole dish or the like is provided which is provided with a re-entry portion or annular shoulder which is adapted to cooperate with the clamping means of the handle apparatus for positively preventing slipping of the dish with respect to the handle means.

An actuating means includes a locking cam which is adapted to lock the clamping element in its operative clamping position, the actuating means being quickly and easily operated to readily attach the handle to a receptacle or remove the handle from a receptacle.

The clamping element itself is of a novel unitary construction including an intermediate portion which is wrapped around a pivot pin whereby the clamping element is efficiently supported by the handle apparatus in a very effective and sturdy manner.

A further feature of the invention is the fact that the clamping element and gripping shoulder may be specifically configured to fit a receptacle having either a substantially straight side wall portion or a curved side wall portion. The inner surface of the gripping shoulder and the outer or clamping surface of the clamping element are configured in a complementary manner to snugly fit against either a curved or straight wall.

An object of the present invention is to provide a new and novel detachable handle apparatus which is particularly adapted for use with casserole dishes and the like.

A further object of the invention is the provision of a detachable handle apparatus which can be clamped directly to the upstanding wall of a receptacle without the necessity of having any special attaching lips or handle-like means formed on the receptacle, and yet which rapidly clamps the receptacle to the handle without the danger of the receptacle becoming accidentally released from the handle.

A still further object of the invention is to provide a detachable handle apparatus which is quite simple, compact and inexpensive in construction, and yet which is sturdy and reliable in operation.

Yet another object of the invention is to provide a clamping arrangement which is adapted to engage either a flat or curved side wall of an associated receptacle.

Still another object of the invention is to provide a novel combination including a casserole dish having an elongated shoulder means formed thereon for cooperating with the novel clamping means of the handle apparatus for positively preventing slippage of the casserole dish with respect to the handle apparatus.

Other objects and many attendant advantages of the present invention will become more apparent when considered in connection with the specification and accompanying drawing, wherein:

FIG. 1 is a top view of the handle apparatus in clamping position upon a wall of a casserole dish or the like as shown broken away;

FIG. 2 is a side view of the assembly shown in FIG. 1;

FIG. 3 is an enlarged bottom view of a portion of the handle assembly;

FIG. 4 is an enlarged sectional view taken along line 4—4 of FIG. 2 looking in the direction of the arrows;

FIG. 5 is an enlarged sectional view illustrating the clamping arrangement of the device shown in FIG. 2;

FIG. 6 illustrates the hand grip member according to the present invention;

FIG. 7 is an enlarged sectional view taken along line 7—7 of FIG. 2 looking in the direction of the arrows;

FIG. 8 is an enlarged view illustrating the actuating rod of the device;

FIG. 9 is a bottom view similar to FIG. 3 illustrating a modified form of the outer end portion of the gripping mechanism;

FIG. 10 is a view partially in section illustrating the novel combination including a specially constructed dish along with a modified form of the handle apparatus; and FIG. 11 is an enlarged sectional view illustrating the clamping arrangement of the apparatus shown in FIG. 10.

Referring now to the drawings wherein like reference characters designate corresponding parts throughout the several views, a casserole dish or the like is indicated generally by reference numeral 10 and includes an upwardly extending side wall 11, side wall 11 including an inner surface 12 and an outer surface 13 which are shown as being disposed substantially parallel to one another.

The detachable handle apparatus according to the present invention is illustrated generally by reference numeral 15 and includes a hand grip member 16 which is seen most clearly in FIG. 6. The hand grip member has a longitudinal bore 17 extending therethrough. The end portion 20 of the hand grip member is of reduced size and is provided with a substantially U-shaped channel 21 formed through the lower portion thereof. An integral stop element 22 is formed on the opposite end face 23 of the hand grip member.

An actuating rod 25 as seen most clearly in FIG. 8 is provided with a first end portion 26 of reduced diameter having a head 41 formed thereon, and the opposite end portion 27 thereof is provided with a plurality of grooves 28. Actuating rod 25 is mounted within the longitudinal bore in the hand grip member as seen in FIGS. 1 and 2.

End portion 27 of the actuating rod is mounted within a bore 30 in an extension element 31, the grooves being adapted to receive an adhesive substance for securely attaching the extension element to the actuating rod. Extension element 31 is spaced a small distance from the hand grip member, this space being indicated by reference numeral 32, and an arcuate groove 35 is provided in the end face 36 of the extension element, groove 35 extending through an arc of approximately 90 degrees and receiving member 22 formed integral with the hand grip member. It is evident that the groove 35 and element 22 cooperate to limit movement of the extension element with respect to the grip member and the extension element can rotate through an angle of approximately 90 degrees with respect to the hand grip element.

It is evident that rotation of the extension element will produce a corresponding rotation of the actuating rod having a cam element 40 mounted at the outer end thereof and retained in position by head 41 formed on the end of the actuating rod. A plate member 42 having a shoulder 43 formed thereon for engaging the cam element 40 is mounted upon actuating rod 41 to assist in supporting the actuating rod as hereinafter described, and a sheet 44 of insulating material is disposed between plate 42 and the end surface 45 of portion 20 of the hand grip member for reducing the conduction of heat to the hand grip member.

As seen most clearly in FIG. 4, cam element 40 is provided with a rounded lower surface 50 which merges into a flat surface 51. Surface 50 is formed as an arc having a radius at the axis of rotation 52 of the actuating rod, and surface 51 is slightly offset from a line tangent to arc 50 for a purpose hereinafter described.

Body means 60 includes a central top portion 61 having integral depending side wall portion 65 formed at the opposite edges thereof, the top portion 61 and side walls 65 defining what may be termed a neck portion which is adapted to fit about the reduced end portion 20 of the hand grip member. Side wall portions 65 are provided with aligned openings 66 which are adapted to be aligned with the channel 21 in portion 20 of the hand grip member.

An attaching means indicated generally by reference numeral 70 includes a hollow cylindrical member 71 having threads formed on the inner bore thereof, and a screw member 72 which is threadedly received within member 71. It is apparent that attaching means 70 serves to secure the gripping mechanism to the hand grip member and positively prevents separation thereof. The side walls 65 of the gripping mechanism are disposed closely adjacent the side walls of portion 20 of the hand grip member, and the lower portions of side walls 65 are turned inwardly at 65' as shown most clearly in FIG. 4 and are adapted to engage the under surface 75 of extension 20 for more securely mounting the gripping mechanism in place.

Plate 42 mounted on the actuating rod adjacent cam 40 is provided with a configuration complementary to that of the inner surface of the neck portion of the gripping mechanism whereby the plate is supported by the gripping mechanism and serves as an additional support for the actuating rod 25.

As seen most clearly in FIG. 5, a depending gripping shoulder 77 is formed at the forward end of the body means, it being noted that the inner surface 78 of the gripping shoulder extends at an obtuse angle to the longitudinal axis A—A of the body means.

A pivot pin 80 is supported within openings 80' formed in the side walls 65 at opposite sides of the body means 60, and a clamping element indicated generally by reference numeral 81 is supported upon pivot pin 80, the pivot pin having a pivot axis represented by reference numeral 82.

As seen most clearly in FIG. 5, clamping element 81 comprises an integral member formed of resilient material such as spring steel or the like and includes a clamping end portion 85 which is adapted to engage the outer surface 13 of the receptacle to clamp the wall of the receptacle between the gripping shoulder 77 and the clamping end portion 85 of the clamping element. It will be noted that when in the clamped position as shown in the drawings, the clamping end portion 85 depends at an obtuse angle to the longitudinal axis of the handle and extends substantially parallel to the gripping shoulder 77 thereby defining a space within which the wall of a receptacle can be tightly clamped.

It will be further noted especialy as seen in FIG. 3 that the inner surface of gripping shoulder 77 as well as the outer surface of the clamping end portion 85 of the clamping element are provided with a substantially arcuate complementary configuration, the curvature of these surfaces being substantially similar to the curvature of the inner and outer surfaces respectively of the receptacle 10 to be employed therewith. It will be readily apparent that the curvature of the clamping portions may conform exactly to the curvature of the walls of the receptacle, but that the clamping apparatus will also readily function even if the curvature of the clamping portions is not exactly the same as that of the walls of the receptacle such that the curved clamping portions do not restrict the use of the apparatus to a curved receptacle having only a particular radius of curvature. This is true due to the inherent resilience of the gripping shoulder and clamping end portion which permit a certain amount of adaptation to the walls of receptacles having slightly different thicknesses and slightly different curvatures.

The intermediate portion 95 of the clamping element is of substantially horse-shoe shaped configuration, and is wrapped partially around pivot pin 80 such that the clamping element is free to pivot about pin 80 and yet cannot be removed therefrom when the device is in assembled position as shown. The clamping element is reversely turned at 96 and extends rearwardly in a relatively straight portion 97 and terminates in a locking end portion 98 adapted to engage the locking cam 40. It is apparent that rotation of the locking cam will cause the clamping element to be urged into engagement with the outer surface 13 of the receptacle, the dimensioning of the components being such that clamping end portion 85 will tightly clamp the wall of the receptacle, or in other words if the wall of the receptacle were not disposed between the gripping shoulder and the clamping end portion of the clamping arm when in clamping position, these two latter elements would be spaced from one another a distance slightly less than the thickness of the wall of the receptacle.

Referring again to FIG. 4 of the drawings, the locking cam is illustrated in locking position, and has been rotated as indicated by the arrow into this position. The point of contact 53 between the cam and the upper surface of the clamping element is just beyond the arcuate surface 50 of the cam such that the cam is in effect in an over center position such that it is locked with respect to the clamping element, and will not release until the cam is rotated with respect to the clamping element.

It is evident that a particular advantage of the apparatus is the fact that it can be merely slipped over the upstanding wall of a receptacle, and then clamped in operative position.

The particular disposition of the forward end edge surfaces of the clamping element 81 and the inner surface 78 of the gripping shoulder is advantageous since as seen in FIGS. 2 and 5, the weight of the receptacle will tend to cause the receptacle to pivot about point X which, of course, will cause the inner surface 12 of the receptacle to pivot into tighter engagement with the inner surface 78 of the gripping shoulder 77, and in this manner, accidental displacement of the dish by falling out of the handle apparatus is substantially eliminated. In addition, the clamping element is so constructed and arranged as to tightly clamp the wall of the receptacle between the clamping element and the gripping shoulder so as to positively ensure that the receptacle will not come loose from the handle apparatus during use.

Referring now to FIG. 9 of the drawings, a modification of the apparatus as seen in FIG. 3 is illustrated wherein the corresponding elements have been given the same reference numerals primed. In this modification, it will be noted that the inner surface of gripping shoulder 77' and the outer surface of the clamping end portion 85' are substantially straight as contrasted to the curved configuration of the corresponding elements in FIG. 3. It is, of course, clear that in each case, these surfaces are substantially parallel to one another. It will be obvious that the modification shown in FIG. 9 is particularly adapted to engage a wall of a receptacle wherein the walls extend substantially in straight lines at the portions which are desired to be gripped, although it will be evident that the inherent resilience of the members 77' and 85' will accommodate slight variations in thickness as well as a slight curvature of the associated walls Referring now to FIGS. 10 and 11 of the drawings, a modification is illustrated employing means for positively preventing any slipping of the receptacle with respect to the handle means.

In this particular modification, a novel receptacle indicated generally by reference numeral 100 and having a generally circular plan configuration is employed, this receptacle including a lower upstanding wall portion 101 which flares outwardly at 102 to define an annular seat 103 which faces in an upward direction. The side wall portion includes a second offset upwardly extending portion 104 which extends substantially parallel to the lower wall portion 101, the wall portion 104 terminating in an upper edge 105. The upper wall portion or rim of the dish includes a re-entry indicated by reference 106 thereby defining an annular shoulder portion 107 which extends completely around the upper portion of the rim of the dish.

A substantially circular dome-shaped lid 110 is provided, the lower edge of the peripheral portion 111 of the lid being seated upon the seat portion 103 of the receptacle for providing an effective seal between the receptacle and the lid.

The lid is also provided with an integral tapered knob-like member 112 at the central portion thereof, portion 112 being adapted to be manually grasped for lifting the cover or lid when desired.

The handle apparatus itself as shown in FIGS. 10 and 11 is similar in most respects to that shown in the prior figures, and the same components have been given identical reference numerals primed for the sake of simplicity.

These members cooperate with one another in the same manner as discussed previously, and no further details of description of these similar components is considered necessary.

The clamping element 81' of this modification is mounted upon the pivot pin 80' in the same manner as discussed previously, and cooperates with the cam member 40' for locking the clamping apparatus in clamping position.

However, it will be noted that the outer end portion 85' of the clamping element extends downwardly throughout substantially the vertical dimension of the outer surface of the upper wall portion 104 and terminates in a curved end portion 115 which extends outwardly and away from the wall of the receptacle when in operative position.

In this particular modification, the gripping shoulder 77' extends in a downward direction a less distance than the previously described gripping shoulder and terminates in an outwardly curved end portion 117 which extends away from the inner surface of the wall of the receptacle when in operative position whereas the gripping shoulder and clamping element of the apparatus previously described extend downwardly substantially the same distance, it being noted that the gripping shoulder 77' of the modification shown in FIGS. 10 and 11 extends downwardly a distance substantially less than the end portion 85' of the gripping element thereby accommodating the lid portion 110 which can be readily seated on the seat portion 113 of the receptacle.

It should be noted that in the operative clamping position as seen particularly in FIG. 11, the outer surface 120 of the clamping portion 85' of the clamping element fits snugly up against the outer wall of the receptacle, and the curved arcuate portion 121 of the clamping element fits snugly within the re-entry portion of the rim whereby it is evident that the shoulder portion 107 causes the rim to be locked in position between the clamping element and the gripping shoulder such that the rim can not slip out from between these two members when they have been moved into locked clamping position as shown.

The arcuate curved portions 115 and 117 of the clamping element and gripping shoulder respectively facilitate re-entry of the rim portion between the gripping shoulder and clamping element when mounting the handle apparatus in operative position and prevent excessive wear and interference between these members.

It is apparent from the foregoing that there is provided a new and novel detachable handle apparatus which is especially adapted for use with casserole dishes or the like, and which presents a very attractive appearance and can be quickly and easily attached to or removed from a dish and the like. No special lips or attaching means are necessary on the receptacle, and the apparatus can be simply slipped over the upstanding wall of the receptacle. At the same time, the construction and arrangement is such that accidental release of the receptacle is prevented and the receptacle is very tightly and rigidly clamped in operative position. The device is quite simple, compact and inexpensive in construction, and is also quite sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A detachable handle for cooking sauce pans and like vessels comprising, an elongate handle body, a locking mechanism supported by said handle body and including a locking cam and a clamping element for clamping an article between said clamping element and a portion of said handle body, a pivot pin supported by said handle body, said clamping element comprising an integral elongate member including a forward support end portion for engaging a supported article, an intermediate portion and a rear end locking portion for engaging said locking cam, the said intermediate portion of said clamping element including a part curving over and in snug engagement with more than half the circumference of said pivot pin for pivotally supporting the clamping element in said pivot pin, means for actuating said locking cam against said rear end locking portion to effect a clamping engagement of said support end portion with a portion of the vessel interposed between the support end portion and a part of the handle body, and said pivot pin encircling part being adapted to firmly grip the pivot pin upon an increased application of force upon said support end portion, said part of the handle body against which a portion of a vessel is clamped comprising a forwardly extending depending gripping shoulder disposed at the forward end of said handle body.

2. Apparatus as defined in claim 1, wherein said elongate handle body has a longitudinal axis, said gripping shoulder extending at an obtuse angle to said longitudinal axis.

3. Apparatus as defined in claim 1, wherein the lower end portions of said gripping shoulder and said clamping element are flared outwardly away from one another for facilitating entry of a portion of a vessel therebetween.

References Cited in the file of this patent

UNITED STATES PATENTS

| | | |
|---|---|---|
| 606,904 | Tubbs | July 5, 1898 |
| 929,819 | Bertram | Aug. 3, 1909 |
| 1,271,716 | Karle | July 9, 1918 |
| 1,453,543 | Bonser | May 1, 1923 |
| 1,735,500 | Halsted | Nov. 12, 1929 |
| 1,840,775 | Hardy | Jan. 12, 1932 |
| 2,450,193 | Galliano | Sept. 28, 1948 |
| 2,478,784 | Serio | Aug. 9, 1949 |
| 2,851,299 | Serio | Sept. 9, 1958 |

FOREIGN PATENTS

| | | |
|---|---|---|
| 155,482 | Australia | Aug. 27, 1953 |